United States Patent [19]

Zane et al.

[11] Patent Number: 4,736,921
[45] Date of Patent: Apr. 12, 1988

[54] CLAMP FOR HOLDING BICYCLE LOCK

[75] Inventors: Michael S. Zane, Brookline; Peter L. Zane, Southeastern, both of Mass.

[73] Assignee: KBL Corporation, Boston, Mass.

[21] Appl. No.: 737,542

[22] Filed: May 24, 1985

[51] Int. Cl.[4] .............................................. A47F 5/00
[52] U.S. Cl. .................................. 248/316.2; 24/279; 24/284; 248/229; 248/541
[58] Field of Search .............. 248/316.2, 316.1, 309.1, 248/225.31, 540, 539, 541, 229, 230, 311.3, 74.2, 316.7; 24/275, 278, 279, 280, 573, 545; 224/30 R; 267/53

[56] References Cited

U.S. PATENT DOCUMENTS

| | | | |
|---|---|---|---|
| 2,291,219 | 7/1942 | Fontecilla | 24/545 |
| 3,521,332 | 7/1970 | Kramer | 248/229 X |
| 3,747,166 | 7/1973 | Eross | 248/229 X |
| 3,843,083 | 10/1974 | Angibaund | 248/229 |

FOREIGN PATENT DOCUMENTS

| | | | |
|---|---|---|---|
| 3019303 | 11/1981 | Fed. Rep. of Germany | 248/742 |
| 0011325 | of 1897 | United Kingdom | 248/540 |

Primary Examiner—Ramon O. Ramirez
Attorney, Agent, or Firm—Morse, Altman & Dacey

[57] ABSTRACT

A clamp for releasably securing a lock to a bicycle frame is disclosed. The clamp is formed as a unitary body of a hard yet resilient plastic material, which unitary body defines a pair of spaced tubular openings: one to fit about the frame and the other to hold the lock. The pair of tubular openings are axially split at their respective outer peripheries, with an arcuate segment being removed from each tubular opening along the respective splits. A pair of opposed parallel shoulders extend astride each of the splits, with each pair of shoulders featuring fastening means. Preferably, the plastic material is nylon. Preferably, one of the pair of spaced tubular openings is tapered along its axial length.

11 Claims, 4 Drawing Sheets

4,736,921

CLAMP FOR HOLDING BICYCLE LOCK

BACKGROUND OF THE INVENTION

1. Field of the Invention

The present invention relates generally to mounting means for bicycle locks and, more particularly, to a clamp for releasably securing a bicycle lock to a bicycle frame.

2. The Prior Art

Once Howard L. Pippen invented the cycle lock in 1922 (U.S. Pat. No. 1,402,725), the invention of the lock holder wasn't far behind, see the U.S. Pat. No. 1,629,859 granted in 1926.

In more recent years and with the widespread use of bicycles for recreation, a variety of bicycle locks and suitable means for their mounting have been developed. See U.S. Pat. Nos. 3,924,426 and 3,967,475. In the late 70's, an improved bicycle lock was developed comprising a U-shaped shackle and a cross piece adapted to lock across the ends of the shackle. See U.S. Pat. No. 4,155,231. This lock, featuring a U-shaped shackle and cross piece, has since become a favorite of the cycling public. The lock has undergone further improvements since then, but its essential composition of the U-shaped shackle and the cross piece remained. With the advent of this bicycle lock came also the means for securing it on the bicycle frame, see the same U.S. Pat. No. 4,155,231 and also an improved version thereof in U.S. Pat. No.4,436,232. Each of these mounting means achieves its intended function. Yet, each has its drawbacks. Such drawbacks include that the lock is loosely held, thus rattles when riding the bike. Others are awkward in use, particularly those employing winged nuts. Most of them also are expensive. Thus the need for a simple and inexpensive means to mount such a lock to a bicycle frame.

SUMMARY OF THE INVENTION

It is a principal object of the present invention to overcome the above disadvantages by providing a clamp for releasably securing a bicycle lock comprised of a U-shaped shackle and a cross bar across the open end thereof to a bicycle frame.

More specifically, it is an object of the present invention to provide a clamp for releasably securing a bicycle lock to a bicycle frame comprising a unitary body formed of a hard yet resilient material, a pair of spaced tubular openings formed in the unitary body: one to fit about the bicycle frame and a second to hold the lock, each of the pair of spaced tubular openings being split axially at its respective outer periphery, with a respective arcuate segment at each periphery being removed along the split, pairs of opposed parallel shoulders extending astride each of the splits, and an appropriate fastening means provided in each of the pairs of opposed parallel shoulders, whereby one of the spaced tubular openings is secured about the frame and the second of the spaced tubular openings is designed releasably to secure a part of the bicycle lock therein. Preferably, the hard yet resilient material is formed of a hard plastic, such as a linear polyamide, preferably nylon. Preferably, the second of the spaced tubular openings is tapered along its axial length. Preferably, the required tension in the fastening means for securely and releasably holding the part of the bicycle lock in the second of the spaced tubular openings is conveniently adjustable by the user. Preferably, one of the pairs of opposed parallel shoulders adjacent the second of the spaced tubular openings is provided with a detent designed further to securely hold the bicycle lock therein.

Other objects of the present invention will in part be obvious and will in part appear hereinafter.

The invention accordingly comprises the clamp for holding a bicycle lock of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection wiyh the accompanying drawings, wherein.

DETAILED DESCRIPTION OF THE PREFERRED EMBODIMENTS

Figure 1:
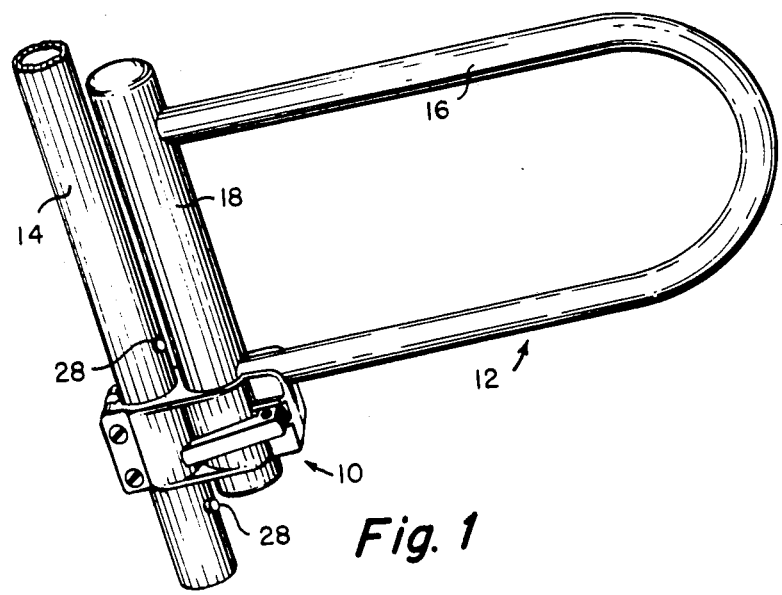
FIG. 1 is a perspective view of a clamp, constructed in accordance with the present invention, releasably securing a lock, comprised of a U-shaped shackle and a cross bar connected across the open end thereof, to an upright post of a bicycle frame.
Figure 2:
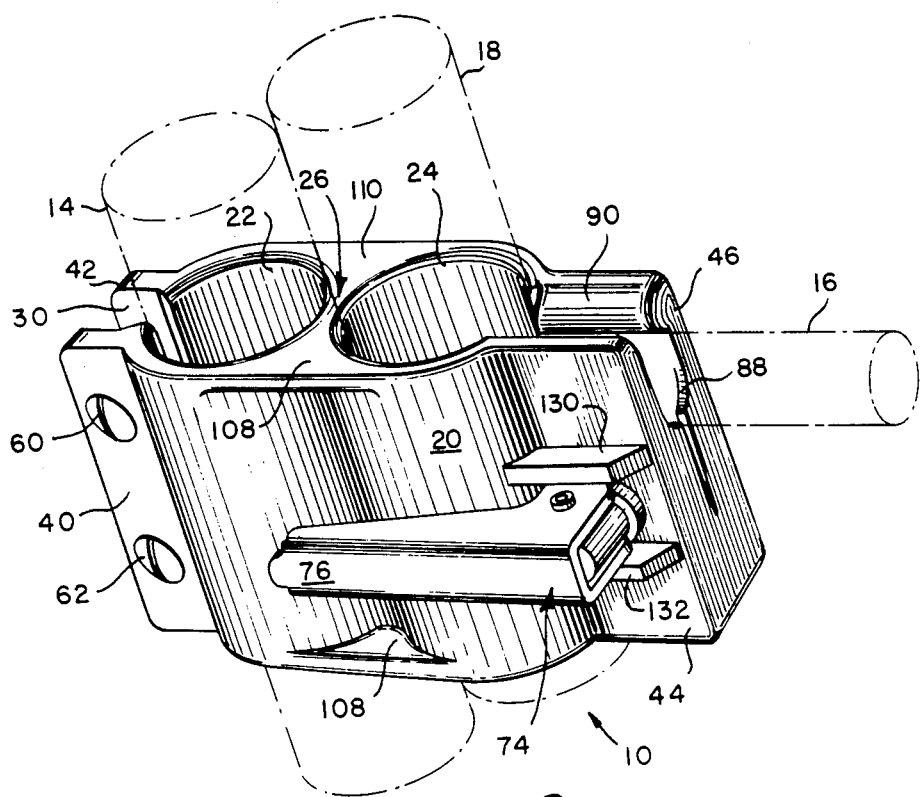
FIG. 2 is an enlarged perspective of the clamp shown in FIG. 1.

In general, one preferred illustrated embodiment of a clamp 10 for releasably securing a bicycle lock 12 to an upright post 14 of a bicycle frame is shown in perspective in FIGS. 1 and 2. The bicycle lock 12 is comprised of a U-shaped shackle 16 and a cross bar 18 connected across the open end of the shackle 16. Preferably, the bicycle lock 12 is of the type shown in and described in one of applicants' previous patents, to wit, U.S. Pat. No. 4,155,231 issued May 22, 1979. It must be pointed out however, that the clamp 10 of the invention is designed to securely hold any like bicycle lock 12 which is comprised of the U-shaped shackle 16 and the cross bar 18 as illustrated in FIGS. 1 and 2.

Most if not all of these bicycle locks 12 preferably are provided with a protective covering skin made of plastic, such as vinyl or the like, which skin is applied thereto in any known manner, including dipping. The protective covering skin on the bicyclce lock 12 not only protects the lock itself and makes it more attractive looking, but also and more importantly, the skin is designed to protect the finished surfaces of the bicycle frames from being scratched when the lock 12 is secured to or removed from the frame. When this protective covering skin is applied to the bicycle lock 12, in particular to the cross bar 18 thereof, by the vinyl dipping process, a process most frequently used, the covering skin is not applied uniformly along the axial length of the cross bar 18. Rather, as in candle making, the skin is applied with a slight taper from the bottom to the top. This is so since the bottom of the cross bar 18 enters the dip first and leaves the dip last, it consequently acquires a thicker deposit of the plastic skin than the top. This taper of the covering skin of the cross bar 18 has been taken into account in designing the clamp 10 of the invention.

An enlarged perspective view of the clamp 10 is illustrated in FIG. 2. The clamp 10 is formed as a unitary body 20 from a hard yet resilient plastic material, such as a linear polyamide, preferably nylon, in a suitable mold and preferably by injection molding. The unitary body 20 is formed with a pair of generally paraxial barrel portions to define a pair of spaced tubular openings 22 and 24. The tubular opening 22 is designed to fit and be fastened about the upright post 14 of the bicycle frame, and the other tubular opening 24 is desinged releasably to secure the cross bar 18, and thereby the bicycle lock 12, therein. Preferably, and so as better to accomodate the cross bar 18 provided with the tapered protective skin, the tubular opening 24 also preferably is tapered, as may be best observed in FIG. 7 to provide an inner tapered conical surface 25. The tubular openings 22 and 24 are joined along adjacent paraxial increments and are spaced, as at 26, one from the other. Most bicycle frames nowadays are provided at the factory with appropriate water-bottle mountings 28, 28 located at the upright post 14, substantially as shown. These mountings 28, 28 protrude from the past 14 a certain short distance and the spacing 26 between the tubular openings 22 and 24 is designed to give sufficient clearance beyond these mountings 28, 28 for the insertion and removal of the cross bar 18. The spacing 26 thus must at least be equal to, and preferably should exceed somewhat, the distance of protrusion of the water-bottle mountings 28, 28 from the post 14.

Figure 3:
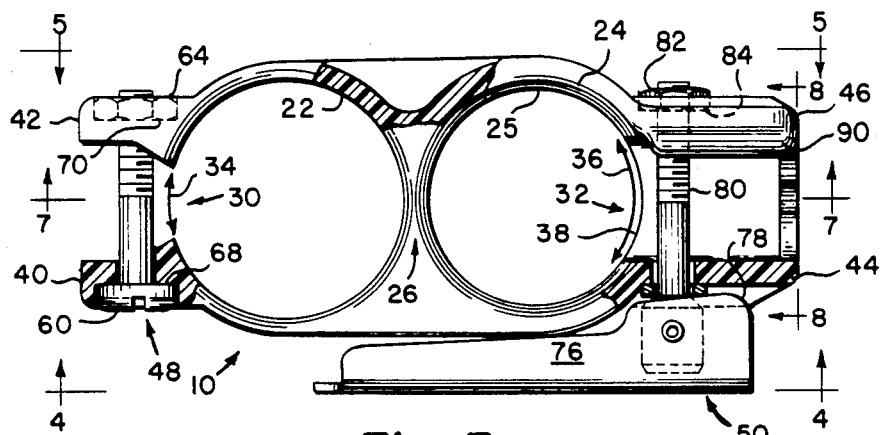
FIG. 3 is a plan view of the clamp of FIG. 2.
Figure 4:
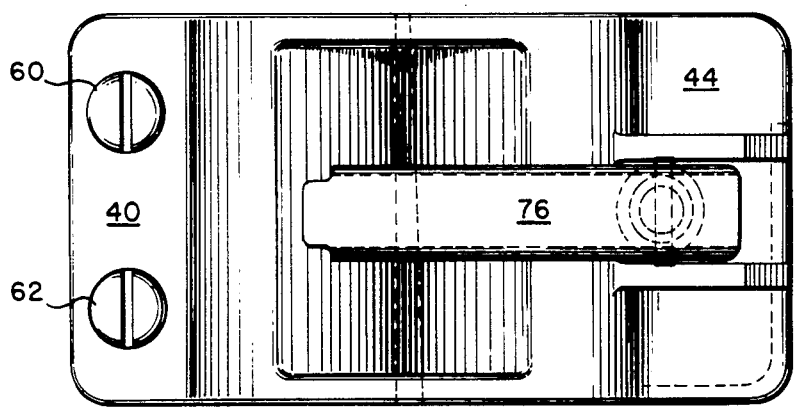
FIG. 4 is a side elevation of the clamp along the lines 4—4 of FIG. 3.
Figure 5:
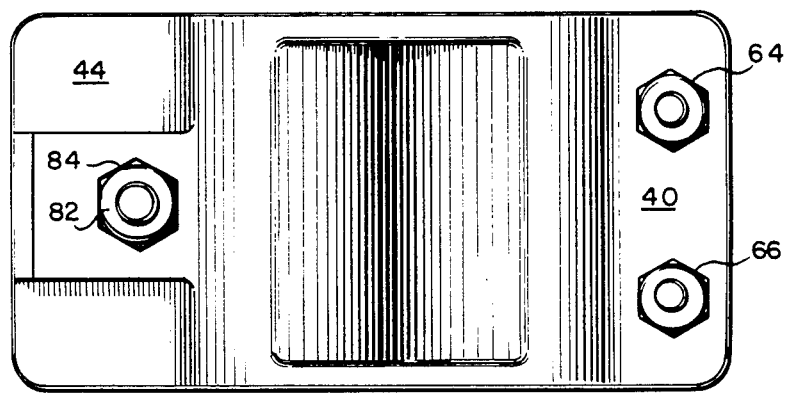
FIG. 5 is a side elevation of the clamp along the lines 5—5 of FIG. 3.

Each of the pair of spaced tubular openings 22 and 24, specifically their respective peripheries, is split axially, as at 30 and 32, respectively, note FIG. 3, to define remote paraxial increments thereat. A respective arcuate segment, indicated by the arrows 34 and 36, is illustrated as being removed from the respective periphery of each tubular opening 22 and 24 along the splits 30 and 32. It will be observed that the split 30 extends all throughout the axial length of the tubular opening 22 and almost all the way along the axial length of the tubular opening 24 but for the presence of a small segment 38 at the bottom of the opening 24, which small segment 38 is less than the thickness of the space 26 separating the tubular openings 22 and 24 from each other. Pairs of opposed parallel shoulders 40 and 42 on one side and 44 and 46 on the other side extend from astride each of the splits 30 and 32, respectively. These pairs of opposed parallel shoulders 40, 42 and 44, 46 are designed to accomodate respectively therein suitable fastening means 48 and 50. Fastening means 48 is designed to secure the clamp 10 to the upright post 14 of the bicycle frame, and fastening means 50 is designed releasably to secure the bicycle lock 12, more particularly the cross bar 18 thereof, within the clamp 10.

Figure 9:
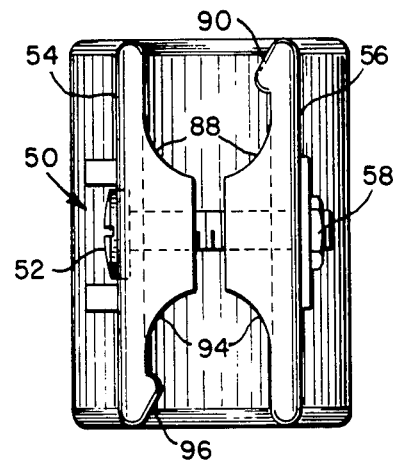
FIG. 9 is a view similar to FIG. 8 but showing a different embodiment of a clamp constructed in accordance with the present invention.

Each of the fastening means 48 and 50 can comprise a single threaded screw or bolt 52 extending from one shoulder 54 to and through the other shoulder 56 and a nut 58, observe FIG. 9. Preferably however, at least the fastening means 48 comprises a pair of threaded screws 60 and 62 and a pair of nuts 64 and 66. Preferably, the shoulders 40 and 42 are countersunk, as at 68 and 70, to the full widths of both the heads of the screws 60 and 62 and of the nuts 64 and 66 so as to present a smooth and flush appearance when assembled. Also preferably, the length of the screws 60 and 62 is so chosen that, when the screws 60 and 62 are properly tightened about the upright post 14 of the bicycle frame, only a small portion, if at all, of the ends of the screws 60 and 62 protrudes therefrom, observe FIG. 3.

The second fastening means 50 can comprise the single screw 52 and the nut 58, as above described with reference to FIG. 9, or it can comprise a tensioning means 74 including a manually operable arm 76. The arm 76 has a bearing surface 78 designed to impart the required tension to the tensioning means 74, once the bicycle lock 12 is in place within the tubular opening 24.

The arm 76 is pivotally connected to a threaded screw 80, which is secured in place by a nut 82. The shoulder 46 also is countersunk, as at 84, but only to about one half of the thickness of the nut 82. This aids in adjusting the tension of the tensioning means 74, which tends to become slack after a while, due to some extent to changes in tolerances of the plastic material forming the clamp 10. To adjust for the proper tension, the operator, with the arm 76 extended parallel the screw 80, pushes against the arm 76 until the nut 82 is dislodged from the partially countersunk hole 84. With the nut 82 now being free to rotate on the end of the threaded screw 80, a one half or so turn thereof will bring it once again snugly against the side of the shoulder 46, preventing its further rotation. By relocating then the nut 82 into its partially countersunk hole 84, the desired tension in the tensioning means 74 again has been achieved. As mentioned, the tubular opening 24 preferably is tapered, as at 25, observe FIGS. 3 and 7, to accomodate the taper in the covering vinyl skin of the cross bar 18 of the bicycle lock 12. In order further to securely hold the bicycle lock 12 in the clamp 10, the pair of opposed parallel shoulders 44 and 46 also are provided with a U-shaped support 88, observe FIGS. 2 and 8, to nestle therein a portion of the U-shaped shackle 16 of the lock 12. Preferably and to further secure the lock 12 in the clamp 10 and to guard against its potential rattle, even when traversing rough tension, a detent 90 is provided along the top edge of the shoulder 46 adjacent and normal to the U-shaped support 88. The detent 90 is designed to exert a slight downward pressure on a portion of the top periphery of the U-shaped shackle 16.

The embodiment illustrated in FIG. 9, already described as having a fastening means 50 comprised of the single screw 52 and nut 58, also is shown as having a second U-shaped support 94 formed in the opposed parallel shoulders 54 and 56 but diametrically opposed to the first U-shaped support 88. This second U-shaped support 94 preferably also is provided with a detent 96. With the clamp formed as illustrated in FIG. 9, the clamp can be secured to the upright post 14 with either the U-shaped support 88 facing upward or the other support 94 facing upward, provided of course that in this embodiment the second tubular opening 24 is not tapered, as hereinabove described with reference to FIGS. 1-5. It must be pointed out that the single screw 52 and nut 58 also can be used in the embodiment of the clamp 10 shown in and described with reference to FIGS. 1-5, i.e., without at the same time also featuring a second U-shaped support 94.

Figure 6:
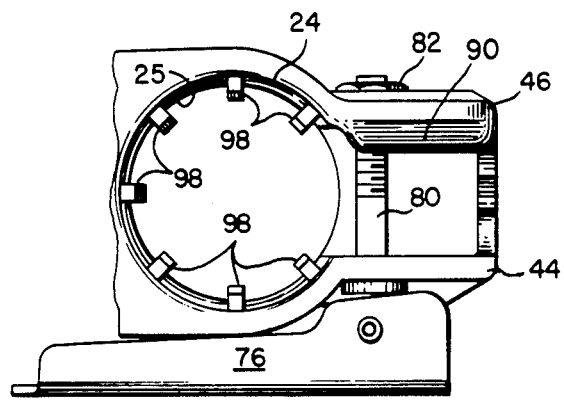
FIG. 6 is a fragmentary plan view, similar to FIG. 3, but showing a different embodiment of a clamp constructed in accordance with the present invention.
Figure 7:
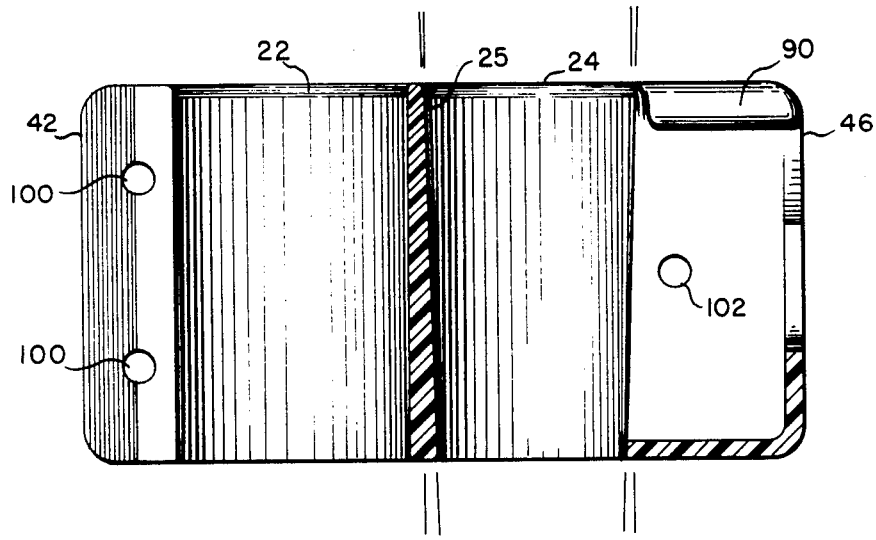
FIG. 7 is a section along the lines 7—7 of FIG. 3.

In the embodiment of the clamp illustrated in fragmentary plan view in FIG. 6, the second spaced opening 24, in addition to being tapered as at 25, also is provided with a plurality of ribs 98, which ribs 98 also are tapered along the axial length of the spaced opening 24. The plurality of ribs 98 are designed to accomodate a smaller bicycle lock 12 having a smaller diameter cross bar 18. In all other respects, this clamp is just like the clamp 10 described with reference to FIGS. 1-5. FIG. 7, which is a section along the lines 7—7 of FIG. 3, shows a pair of holes 100, 100 formed in the shoulder 42 to accomodate the screws 60 and 62 respectively, and a hole 102 in the shoulder 46 for the screw 80.

Figure 10:
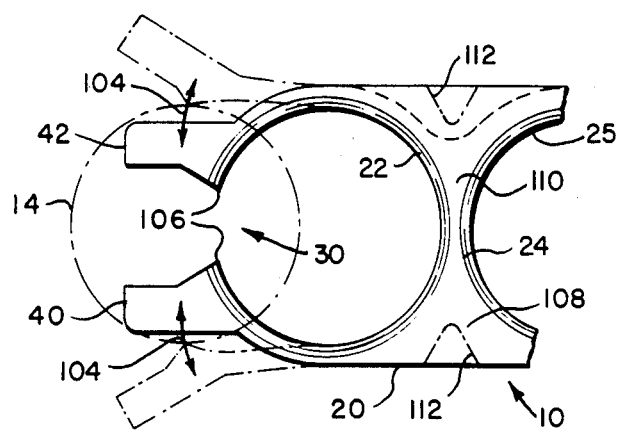
FIG. 10 illustrates the snap-mounting of a fragmentary clamp in plan view to the upright post of a bicycle frame.

In FIG. 10 is illustrated, in a fragmentary plan view, how the clamp 10 of the invention is designed to snap-fit about the upright post 14 of the bicycle frame. This snap-fitting of the clamp 10 about the post 14 simply is effected by the user first removing the screws 60, 62 and the nuts 64, 66 from the clamp 10, followed by gently forcing apart the shoulders 40 and 42, as indicated by the arrows 104, until the edges 106 of the axial split 30 touch the periphery of the post 14 at about its diameter, substantially as shown. Then by simply pushing the clamp 10 toward the post 14, the shoulders 40 and 42 will converge and once again assume their initial original positions, with the post 14 finding itself within the first tubular opening 22, as illustrated in FIGS. 1 and 2. Thereafter, by replacing the screws 60, 62 and the nuts 64, 66 in their places and tightening them with a screwdriver (or a convenient dime), the clamp 10 will have been securely fastened about and to the upright post 14 of the bicycle frame.

In FIG. 10 also is illustrated a further possible modification in the forming of the unitary body 20 of the clamp 10. As is clearly visible in FIG. 2, the unitary body 20 is formed with pairs of flat connecting web portions 108, 108 and 110, 110. To achieve added flexibility, which may be desirable during snap-fitting of the clamp 10 to the post 14, V-shaped cuts 112, illustrated in dashed lines, preferably are provided in these web portions 108, 108 and 110, 110, substantially as shown.

Figures 11, 12:
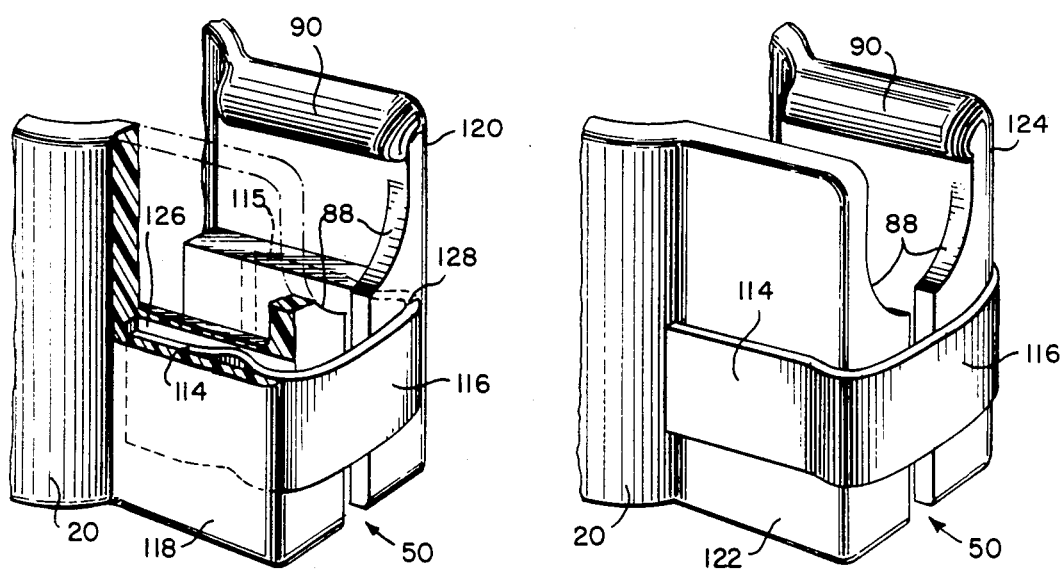
FIG. 11 illustrates a fragmentary clamp in end perspective and illustrating a further embodiment thereof.
FIG. 12 is a view similar to FIG. 11 but showing a still further embodiment of the clamp of the invention.

In FIGS. 11 ands 12 are illustrated, respectively, two additional and different types of the second fastening means 50 for releasably securing the bicycle lock 12 in and to the clamp 10. In both embodiments, a clamp-spring 116 is employed to urge the shoulders 118, 120 and 122, 124 respectively toward one another. The clamp spring 116 is designed to stay in place in both embodiments. In the embodiment of FIG. 11, the shoulders 118 and 120 are each formed with respective vertical slots 126 and 128. These slots 126 and 128 are designed to receive the legs 114 and 115 of the clamp-spring 116. In contrast, the shoulders 122 and 124 have no slots and the legs 114 and 115 are simply clamped about their outer faces, as shown. Without the presence of the slots 126 and 128 however, the spring 116 will eventually wear itself downward on the shoulders 122 and 124, and will have to be adjusted upwardly by the user, every now and then.

Figure 8:
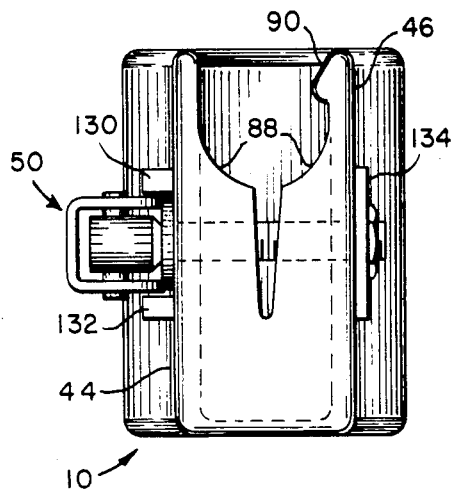
FIG. 8 is an end view along the lines 8—8, of the clamp shown in FIG. 3.

It will also be noted that the shoulders 118, 120 and 122, 124 outwardly are smooth, i.e., they do not feature the pair of reinforcing ribs 130, 132 present on the shoulder 44, nor the reinforcing portion 134 formed on the shoulder 46, observe FIGS. 2 and 8.

Thus it has been shown and described a clamp 10 for releasably securing a bicycle lock 12 to an upright post 14 of a bicycle frame, which clamp 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A clamp for releasably securing to a bicycle frame a lock comprised of a U-shaped shackle and a cross bar connected across the open end thereof comprising:
   a. a unitary body formed of a hard yet resilient material;
   b. said unitary body defining a pair of spaced and physically separated tubular openings through said body: one to fit about said bicycle frame and a second to hold said cross bar of said lock;
   c. each of said pair of spaced and physically separated tubular openings being split axially at its respective outer periphery with a respective arcuate segment of each said periphery being removed along said split, said respective arcuate segment removed along said split of said one of said pair of spaced tubular openings being designed to allow for snap-fitting said clamp about said bicycle frame;
   d. pairs of opposed parallel shoulders extending astride each of said splits; and
   e. fastening means provided in each of said pairs of opposed parallel shoulders;
   f. said second of said pair of spaced tubular openings is tapered along its axial length (to provide an inner tapered conical surface), and is provided with a plurality of ribs also tapered along their axial length.

2. The clamp of claim 1 wherein said hard yet resilient material is nylon and wherein one of said fastening means comprises a spring clip.

3. The clamp of claim 1 wherein said fastening means in one of said pairs of opposed parallel shoulders comprises a pair of nuts and bolts and in the second of said pairs of opposed parallel shoulders comprises a single nut and a single bolt, wherein said pairs of opposed parallel shoulders are provided with countersunk holes to accommodate flush said nuts and bolts therein, and wherein said second of said pairs of opposed parallel shoulders is provided with a countersunk hole to accommodate about one half of the thickness of said nut therein so as to facilitate the tension adjustment of said single nut and single bolt on said second pairs of opposed parallel shoulders.

4. A clamp for releasably securing to a bicycle frame a lock comprised of a U-shaped shackle and a cross bar connected across the open end thereof comprising:
   a. a unitary body formed of a hard yet resilient material;
   b. said unitary body defining a pair of spaced tubular openings: one to fit about said bicycle frame and a second to hold said cross bar of said lock;
   c. each of said pair of spaced tubular openings being split axially at its respective outer periphery, with a respective arcuate segment of each said periphery being removed along said split;

d. pairs of opposed parallel shoulders extending astride each of said splits; and
e. fastening means provided in each of said pairs of opposed parallel shoulders;
f. wherein one of said pairs of opposed parallel shoulders is formed with a U-shaped support for said U-shaped shackle of said lock and wherein said one of said pairs of opposed parallel shoulders is provided with a detent adjacent and normal to said U-shaped support.

5. A clamp for releasably securing to a bicycle frame a lock comprised of a U-shaped shackle and a cross bar connected across the open end thereof comprising:
   a. a unitary body formed of a hard yet resilient material;
   b. said unitary body defining a pair of spaced tubular openings: one to fit about said bicycle frame and a second to hold said cross bar of said lock;
   c. each of said pair of spaced tubular openings being split axially at its respective outer periphery, with a respective arcuate segment of each of said periphery being removed along said split;
   d. pairs of opposed parallel shoulders extending astride each of said splits; and
   e. fastening means provided in each of said pairs of opposed parallel shoulders; wherein one of said pairs of opposed parallel shoulders is formed with a pair of opposed U-shaped supports for U-shaped shackle and wherein each of said pairs opposed parallel shoulders is provided with respective detents adjacent and normal to each of said pairs of opposed U-shaped supports.

6. A clamp for securing to a bicycle frame a lock comprised of a U-shaped shackle and a cross bar connected across the open end thereof comprising:
   a. unitary body structure formed of a hard yet resilient material;
   b. said unitary body structure defining a pair of spaced tubular openings through said structure;
   c. each of said pair of spaced tubular openings being split axially at its respective opposed outer periphery, with a respective arcuate segment of each of said outer periphery being removed along said split;
   d. two pairs of opposed parallel shoulders extending along each of said splits from each of said pair of spaced tubular openings;
   e. each of said two pairs of opposed parallel shoulders provided with respective fastening means, whereby one of said pair of spaced tubular openings is secured about said frame and the other of said pair of spaced tubular openings is designed releasably to secure said cross bar of said lock therein;
   f. wherein one of said fastening means comprises a spring clip, wherein one of said two pairs of opposed parallel shoulders is formed with a U-shaped support for said U-shaped shackle and with a detent adjacent and normal to said U-shaped support to secure said shackle therein.

7. A clamp for releasably securing a bicycle lock to a bicycle, said clamp comprising:
   a. an integral body composed of a hard resilient polymer;
   b. said body being formed with a pair of generally paraxial barrel portions, said barrel portions being joined along adjacent paraxial increments and having slits along remote paraxial increments;
   c. said body being formed with oppositely extending pairs of shoulders from said remote paraxial increments at opposite edges of said slits;
   d. said barrel portions having walls with generally cylindrical inner and outerfaces;
   e. said barrel portions having webs extending between said outer faces of said barrel portions; and
   f. fastening means associated with said pairs of shoulders for causing said barrel portions to grip portions of said bicycle and said lock therein.

8. The clamp of claim 7 wherein said hard resilient polymer is a linear polyamide, wherein one of said pair of paraxial barrel portions has a tapered conical surface along its axial length, and wherein said fastening means comprises a nut and a bolt.

9. The clamp of claim 7 wherein said fastening means in one of said pairs of oppositely extending shoulders comprises a pair of nuts and bolts and in the second of said pairs of oppositely extending shoulders comprises a single nut and a single bolt.

10. The clamp of claim 7 wherein one of said fastening means comprises a spring clip, wherein one of said two pairs of oppositely extending shoulders is formed with a U-shaped support for said U-shaped shackle and with a detent adjacent and normal to said U-shaped support to secure said shackle therein.

11. A clamp for securing to a bicycle frame provided with a pair of water bottle mounts a lock comprised of a U-shaped shackle and a cross bar connected across the open end thereof comprising in combination;
   a. a bicycle frame having a pair of water bottle mounts;
   b. a unitary body structure formed of a hard yet resilient material;
   c. said unitary body structure defining a pair of adjacently joined spaced tubular openings through said structure, the spacing of said pair of adjacently joined spaced tubular openings at least being equal the distance of protrusion of said pair of water bottle mounts provided on said bicycle frame;
   d. each of said pair of spaced tubular openings being split axially at its respective opposed outer periphery, with a respective arcuate segment of each of said outer periphery being removed along said split;
   e. two pairs of opposed parallel shoulders extending along each of said splits from each of said pair of spaced tubular openings;
   f. each of said two pairs of opposed parallel shoulders provided with respective fastening means, whereby one of said pair of spaced tubular openings is secured about said frame and the other of said pair of spaced tubular openings is designed releasably to secure said cross bar of said lock therein;
   g. one of said pair of spaced tubular openings being tapered along its axial length, and wherein the removal of one of said arcuate segment allows for the snap fitting of said one of said pair of spaced tubular openings about said bicycle frame.

* * * * *